US012568100B2

(12) United States Patent (10) Patent No.: US 12,568,100 B2
Asar et al. (45) Date of Patent: Mar. 3, 2026

(54) SYSTEMS, APPARATUSES, METHODS, AND COMPUTER PROGRAM PRODUCTS FOR ANOMALY DETECTION COMPUTING PROGRAMS

(71) Applicant: HONEYWELL INTERNATIONAL INC., Charlotte, NC (US)

(72) Inventors: Vrushali Asar, Brookhaven, GA (US); Shamma Almarzooqi, Dubai (AE); Khalid Zubairi, Dubai (AE)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 117 days.

(21) Appl. No.: 18/467,194

(22) Filed: Sep. 14, 2023

(65) Prior Publication Data

US 2025/0097241 A1 Mar. 20, 2025

(51) Int. Cl.
*H04L 9/40* (2022.01)
(52) U.S. Cl.
CPC ................................. *H04L 63/1425* (2013.01)
(58) Field of Classification Search
CPC ............. H04L 63/1425; H04L 63/1416; G06F 21/566; G06F 2221/034
See application file for complete search history.

(56) References Cited

U.S. PATENT DOCUMENTS 9,531,614 B1 * 12/2016 Nataraj .................... H04L 43/08
10,686,811 B1 * 6/2020 Ehle ....................... G06N 20/00

11,652,826 B1 * 5/2023 Elgaafary .............. G06V 40/12
726/13
12,432,233 B1 * 9/2025 Yang ...................... H04L 43/062
2005/0193281 A1 * 9/2005 Ide ........................... H04L 69/40
714/4.1
2015/0127595 A1 * 5/2015 Hawkins, II ............. G06N 7/01
706/46

(Continued)

OTHER PUBLICATIONS

Baykara et al., "A review of cloned mobile malware applications for android devices," 2018 6th International Symposium on Digital Forensic and Security (ISDFS) Year: 2018 | Conference Paper | Publisher: IEEE.*

(Continued)

*Primary Examiner* — Roderick Tolentino
(74) *Attorney, Agent, or Firm* — ALSTON & BIRD LLP

(57) ABSTRACT

Systems, apparatuses, methods, and computer program products are provided herein. For example, a computer-implemented method may include identifying a first plurality of anomaly detection computing programs. In some embodiments, the computer-implemented method may include transforming the first plurality of anomaly detection computing programs into a second plurality of anomaly detection computing programs. In some embodiments, the computer-implemented method may include monitoring one or more computing applications using the second plurality of anomaly detection computing programs. In some embodiments, the computer-implemented method may include detecting that a first computing application of the one or more computing applications is affected by an anomaly. In some embodiments, the computer-implemented method may include generating an anomaly characteristics data set for the anomaly based at least in part on the anomaly.

20 Claims, 6 Drawing Sheets

(56) References Cited

U.S. PATENT DOCUMENTS

| | | | | |
|---|---|---|---|---|
| 2019/0294788 | A1* | 9/2019 | Chang .................. | G06F 21/552 |
| 2020/0192769 | A1* | 6/2020 | Ishanov ............... | G06F 21/554 |
| 2020/0213343 | A1* | 7/2020 | Bharrat ................ | G06N 3/045 |
| 2021/0385233 | A1* | 12/2021 | Chopra ............... | G06N 3/0495 |
| 2024/0007342 | A1* | 1/2024 | Gupta .................... | H04L 41/16 |

OTHER PUBLICATIONS

Tiwari et al., "An Android Malware Detection Technique Using Optimized Permission and API with PCA," 2018 Second International Conference on Intelligent Computing and Control Systems (ICICCS) Year: 2018 | Conference Paper | Publisher: IEEE.*

* cited by examiner

SYSTEMS, APPARATUSES, METHODS, AND COMPUTER PROGRAM PRODUCTS FOR ANOMALY DETECTION COMPUTING PROGRAMS

TECHNOLOGICAL FIELD

Embodiments of the present disclosure relate generally to systems, apparatuses, methods, and computer program products for anomaly detection computing programs.

BACKGROUND

Applicant has identified many technical challenges and difficulties associated with systems, apparatuses, methods, and computer program products for anomaly detection computing programs. Through applied effort, ingenuity, and innovation, Applicant has solved problems related to systems, apparatuses, methods, and computer program products for anomaly detection computing programs by developing solutions embodied in the present disclosure, which are described in detail below.

BRIEF SUMMARY

Various embodiments described herein relate to systems, apparatuses, methods, and computer program products for anomaly detection computing programs.

In accordance with one aspect of the disclosure, a computer-implemented method is provided. In some embodiments, the computer-implemented method may include identifying a first plurality of anomaly detection computing programs. In some embodiments, the first plurality of anomaly detection computing programs is in a first computing program format. In some embodiments, the computer-implemented method may include transforming the first plurality of anomaly detection computing programs into a second plurality of anomaly detection computing programs. In some embodiments, the second plurality of anomaly detection computing programs is in a second computing program format. In some embodiments, the computer-implemented method may include monitoring one or more computing applications using the second plurality of anomaly detection computing programs. In some embodiments, the computer-implemented method may include detecting that a first computing application of the one or more computing applications is affected by an anomaly. In some embodiments, the computer-implemented method may include generating an anomaly characteristics data set for the anomaly based at least in part on the anomaly.

In some embodiments, the computer-implemented method may include transmitting an anomaly alert indication to the first computing application.

In some embodiments, the first computing program format is a sigma format.

In some embodiments, the second computing program format is a wazuh format.

In some embodiments, the first computing program format and the second computing program format are in a machine readable format.

In some embodiments, the anomaly characteristics data set comprises one or more of computing application identification data, anomaly identification data, cybersecurity threat level data, cybersecurity attack tactic data, cybersecurity attack technique data, or cybersecurity event source data.

In some embodiments, the computer-implemented method may include generating an anomaly characteristics interface based at least in part on the anomaly characteristics data set.

In some embodiments, the anomaly characteristics interface comprises one or more of a computing application identification component, anomaly identification component, cybersecurity level component, cybersecurity attack tactic component, cybersecurity attack technique component, or cybersecurity event source component.

In some embodiments, the computer-implemented method may include generating an anomaly characteristics component based at least in part on the anomaly characteristics interface.

In some embodiments, the computer-implemented method may include causing the anomaly characteristics component to be displayed on at least a portion of a cybersecurity interface.

In accordance with another aspect of the disclosure, an apparatus is provided. In some embodiments, the apparatus may include at least one processor and at least one non-transitory memory including computer-coded instructions thereon. In some embodiments, the computer-coded instructions, with the at least one processor, cause the apparatus to identify a first plurality of anomaly detection computing programs. In some embodiments, the first plurality of anomaly detection computing programs is in a first computing program format. In some embodiments, the computer-coded instructions, with the at least one processor, cause the apparatus to transform the first plurality of anomaly detection computing programs into a second plurality of anomaly detection computing programs. In some embodiments, the second plurality of anomaly detection computing programs is in a second computing program format. In some embodiments, the computer-coded instructions, with the at least one processor, cause the apparatus to monitor one or more computing applications using the second plurality of anomaly detection computing programs. In some embodiments, the computer-coded instructions, with the at least one processor, cause the apparatus to detect that a first computing application of the one or more computing applications is affected by an anomaly. In some embodiments, the computer-coded instructions, with the at least one processor, cause the apparatus to generate an anomaly characteristics data set for the anomaly based at least in part on the anomaly.

In some embodiments, the computer-coded instructions, with the at least one processor, cause the apparatus to transmit an anomaly alert indication to the first computing application.

In some embodiments, the first computing program format is a sigma format.

In some embodiments, the second computing program format is a wazuh format.

In some embodiments, the first computing program format and the second computing program format are in a machine readable format.

In some embodiments, the anomaly characteristics data set comprises one or more of computing application identification data, anomaly identification data, cybersecurity threat level data, cybersecurity attack tactic data, cybersecurity attack technique data, or cybersecurity event source data.

In some embodiments, the computer-coded instructions, with the at least one processor, cause the apparatus to generate an anomaly characteristics interface based at least in part on the anomaly characteristics data set.

In some embodiments, the anomaly characteristics interface comprises one or more of a computing application identification component, anomaly identification component, cybersecurity level component, cybersecurity attack tactic component, cybersecurity attack technique component, or cybersecurity event source component.

In some embodiments, the computer-coded instructions, with the at least one processor, cause the apparatus to generate an anomaly characteristics component based at least in part on the anomaly characteristics interface.

In some embodiments, the computer-coded instructions, with the at least one processor, cause the apparatus to cause the anomaly characteristics component to be displayed on at least a portion of a cybersecurity interface.

In accordance with another aspect of the disclosure, a computer program product is provided. In some embodiments, the computer program product includes at least one non-transitory computer-readable storage medium having computer program code stored thereon. In some embodiments, the computer program code, in execution with at least one processor, configures the computer program product for identifying a first plurality of anomaly detection computing programs. In some embodiments, the first plurality of anomaly detection computing programs is in a first computing program format. In some embodiments, the computer program code, in execution with at least one processor, configures the computer program product for transforming the first plurality of anomaly detection computing programs into a second plurality of anomaly detection computing programs. In some embodiments, the second plurality of anomaly detection computing programs is in a second computing program format. In some embodiments, the computer program code, in execution with at least one processor, configures the computer program product for monitoring one or more computing applications using the second plurality of anomaly detection computing programs. In some embodiments, the computer program code, in execution with at least one processor, configures the computer program product for detecting that a first computing application of the one or more computing applications is affected by an anomaly. In some embodiments, the computer program code, in execution with at least one processor, configures the computer program product for generating an anomaly characteristics data set for the anomaly based at least in part on the anomaly.

In some embodiments, the computer program code, in execution with at least one processor, configures the computer program product for transmitting an anomaly alert indication to the first computing application.

In some embodiments, the first computing program format is a sigma format.

In some embodiments, the second computing program format is a wazuh format.

In some embodiments, the first computing program format and the second computing program format are in a machine readable format.

In some embodiments, the anomaly characteristics data set comprises one or more of computing application identification data, anomaly identification data, cybersecurity threat level data, cybersecurity attack tactic data, cybersecurity attack technique data, or cybersecurity event source data.

In some embodiments, the computer program code, in execution with at least one processor, configures the computer program product for generating an anomaly characteristics interface based at least in part on the anomaly characteristics data set.

In some embodiments, the anomaly characteristics interface comprises one or more of a computing application identification component, anomaly identification component, cybersecurity level component, cybersecurity attack tactic component, cybersecurity attack technique component, or cybersecurity event source component.

In some embodiments, the computer program code, in execution with at least one processor, configures the computer program product for generating an anomaly characteristics component based at least in part on the anomaly characteristics interface.

In some embodiments, the computer program code, in execution with at least one processor, configures the computer program product for causing the anomaly characteristics component to be displayed on at least a portion of a cybersecurity interface.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
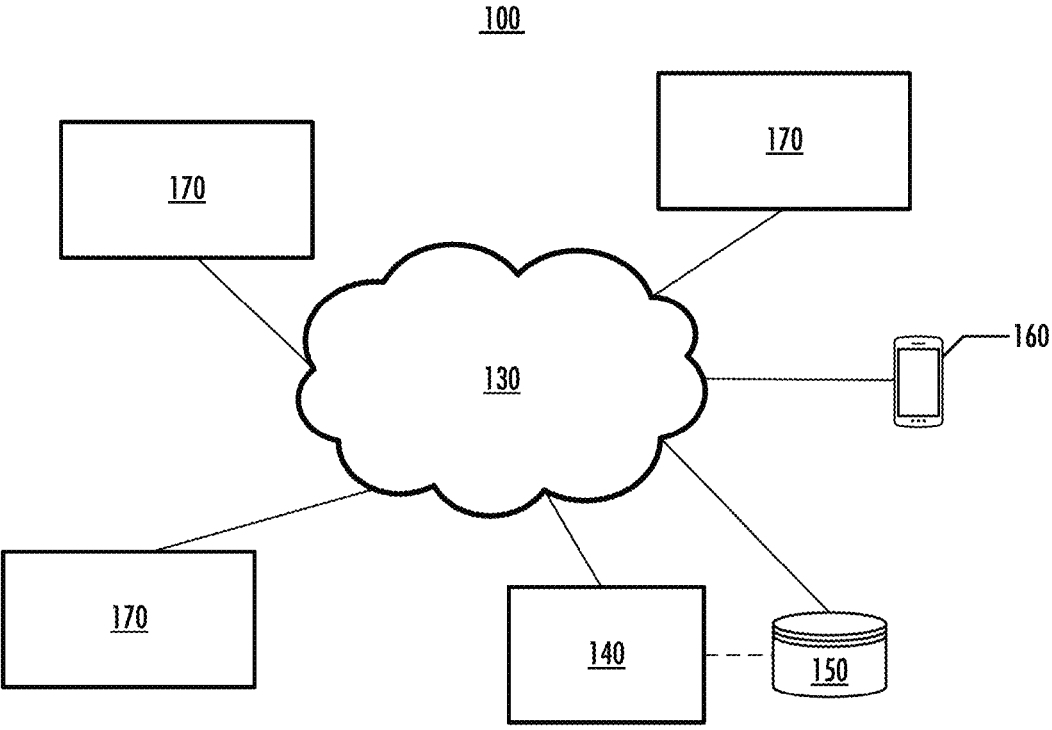
FIG. 1 illustrates an exemplary block diagram of an environment in which embodiments of the present disclosure may operate.

Some embodiments of the present disclosure will now be described more fully herein with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The use of the term "circuitry" as used herein with respect to components of a system, or an apparatus should be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, communication circuitry, input/output circuitry, and the like. In some embodiments, other elements may provide or supplement the functionality of particular circuitry. Alternatively or additionally, in some embodiments, other elements of a system and/or apparatus described herein may provide or supplement the functionality of another particular set of circuitry. For example, a processor may provide processing functionality to any of the sets of circuitry, a memory may provide storage functionality to any of the sets of circuitry, communications circuitry may provide network interface functionality to any of the sets of circuitry, and/or the like.

Overview

Example embodiments disclosed herein address technical problems associated with systems, apparatuses, methods, and computer program products for anomaly detection computing programs. As would be understood by one skilled in the field to which this disclosure pertains, there are numerous example scenarios in which a user may use systems, apparatuses, methods, and computer program products for anomaly detection computing programs.

In many applications, systems, apparatuses, methods, and computer program products for anomaly detection computing programs are desirable. For example, it may be desirable to use systems, apparatuses, methods, and computer program products for anomaly detection computing programs to detect when one or more computing applications are affected by anomaly (e.g., an anomaly that indicates a computing application may be affected by a cybersecurity threat).

Example solutions for systems, apparatuses, methods, and computer program products for anomaly detection computing programs include, for example, using one or more anomaly detection computing programs associated with a first format to detect when one or more computing applications are affected by anomalies. For example, example solutions may use one or more anomaly detection computing programs associated with a sigma format to detect when one or more computing applications are affected anomalies. However, since such example solutions are provided in a first format, the example solutions are unable to be used to detect anomalies associated with certain computing applications. Additionally, such example solutions are unable to determine the characteristics associated with a detected anomaly (e.g., such example solutions are only able to detect anomalies, but not characteristics of such anomalies). Additionally, such example solutions are unable to generate a plurality of interfaces that display the anomaly characteristics in a variety of configurations. Accordingly, there is a need for systems, apparatuses, methods, and computer program products for anomaly detection computing programs that include generating anomaly detection computing programs in a second format (e.g., a wazuh format) that can be used with a variety of computing applications, generating anomaly detection computing programs that are able to determine the characteristics associated with a detected anomaly, and/or generating a plurality of interfaces that display the anomaly characteristics in a variety of configurations.

Thus, to address these and/or other issues related to systems, apparatuses, methods, and computer program products for anomaly detection computing programs, example systems, apparatuses, methods, and computer program product for anomaly detection computing programs are disclosed herein. For example, an embodiment in this disclosure, described in greater detail below, includes a computer-implemented method that includes identifying a first plurality of anomaly detection computing programs. In some embodiments, the first plurality of anomaly detection computing programs is in a first computing program format. In some embodiments, the computer-implemented method may include transforming the first plurality of anomaly detection computing programs into a second plurality of anomaly detection computing programs. In some embodiments, the second plurality of anomaly detection computing programs is in a second computing program format. In some embodiments, the computer-implemented method may include monitoring one or more computing applications using the second plurality of anomaly detection computing programs. In some embodiments, the computer-implemented method may include detecting that a first computing application of the one or more computing applications is affected by an anomaly. In some embodiments, the computer-implemented method may include generating an anomaly characteristics data set for the anomaly based at least in part on the anomaly.

Example Systems and Apparatuses

Embodiments of the present disclosure herein include systems, apparatuses, methods, and computer program products related to systems, apparatuses, methods, and computer program products for anomaly detection computing programs. It should be readily appreciated that the embodiments of the systems, apparatuses, methods, and computer program product described herein may be configured in various additional and alternative manners in addition to those expressly described herein.

FIG. 1 illustrates an exemplary block diagram of an environment 100 in which embodiments of the present disclosure may operate. Specifically, FIG. 1 illustrates one or more computing applications 170. In some embodiments, one or more computing applications 170 may be configured via hardware, software, firmware, and/or a combination thereof, to perform data intake, data processing, data output, and/or other data process(es) associated with performing one or more computing operations associated with a computing application. Although the environment 100 illustrated in FIG. 1 includes three computing applications, it would be understood by one skilled in the field to which this disclosure pertains that the environment 100 may include more or fewer computing applications. For example, the environment may include two computing applications (e.g., the one or more computing applications 170 includes two computing applications).

The network 130 may be embodied in any of a myriad of network configurations. In some embodiments, the network 130 may be a public network (e.g., the Internet). In some embodiments, the network 130 may be a private network (e.g., an internal localized, or closed-off network between particular devices). In some other embodiments, the network 130 may be a hybrid network (e.g., a network enabling internal communications between particular connected devices and external communications with other devices). In various embodiments, the network 130 may include one or more base station(s), relay(s), router(s), switch(es), cell tower(s), communications cable(s), routing station(s), and/or the like. In various embodiments, components of the environment 100 may be communicatively coupled to transmit data to and/or receive data from one another over the network 130. Such configuration(s) include, without limitation, a wired or wireless Personal Area Network (PAN), Local Area Network (LAN), Metropolitan Area Network (MAN), Wide Area Network (WAN), and/or the like.

In some embodiments, the environment 100 may include an anomaly detection system 140. The anomaly detection system 140 may be electronically and/or communicatively coupled to the one or more computing applications 170, one or more user devices 160, and/or the one or more databases 150. The anomaly detection system 140 may be located remotely, in proximity of, and/or within the one or more computing applications 170. In some embodiments, the anomaly detection system 140 is configured via hardware, software, firmware, and/or a combination thereof, to perform data intake of one or more types of data associated with the one or more computing applications 170. Additionally or alternatively, in some embodiments, the anomaly detection system 140 is configured via hardware, software, firmware, and/or a combination thereof, to generate and/or transmit command(s) that control, adjust, or otherwise impact operations of one or more of the one or more databases 150 and/or the one or more computing applications 170. Additionally or alternatively still, in some embodiments, the anomaly detection system 140 is configured via hardware, software, firmware, and/or a combination thereof, to perform data reporting and/or other data output process(es) associated with monitoring or otherwise analyzing operations of one or more of the one or more databases 150 and/or the one or more computing applications 170, for example for generating and/or outputting report(s) corresponding to the operations performed via and/or by the one or more computing applications 170. For example, in various embodiments, the anomaly detection system 140 may be configured to execute and/or perform one or more operations and/or functions described herein.

The one or more databases 150 may be configured to receive, store, and/or transmit data. In some embodiments, the one or more databases 150 may be associated with one or more datasets associated with the anomaly detection system 140 and/or the one or more computing applications 170. In some embodiments, the one or more databases 150 may be associated with datasets received and/or generated by the anomaly detection system 140 in real-time. Additionally or alternatively, the one or more databases 150 may be associated with datasets received and/or generated by the anomaly detection system 140 on a periodic basis (e.g., the datasets may be received and/or generated by the anomaly detection system 140 once per day). Additionally or alternatively, the one or more databases 150 may be associated with datasets received by the anomaly detection system 140 after the anomaly detection system 140 has requested the datasets. Additionally or alternatively, the one or more databases 150 may be associated with datasets based on an input (e.g., a user input) into the anomaly detection system 140 and/or the one or more user devices 160.

The one or more user devices 160 may be associated with users of anomaly detection system 140. In various embodiments, the anomaly detection system 140 may generate and/or transmit a message, alert, or indication to a user via one or more user devices 160. Additionally, or alternatively, the one or more user devices 160 may be utilized by a user to remotely access the anomaly detection system 140. This may be by, for example, an application operating on the one or more user devices 160. A user may access the anomaly detection system 140 remotely, including one or more visualizations, reports, and/or real-time displays.

Additionally, while FIG. 1 illustrates certain components as separate, standalone entities communicating over the network 130, various embodiments are not limited to this configuration. In other embodiments, one or more components may be directly connected and/or share hardware or the like. For example, in some embodiments, the anomaly detection system 140 may include one or more databases 150, which may collectively be located in or at the one or more computing applications 170 (e.g., the anomaly detection system 140 and/or the one or more computing applications 170 may be combined into one or more components).

Figure 2:
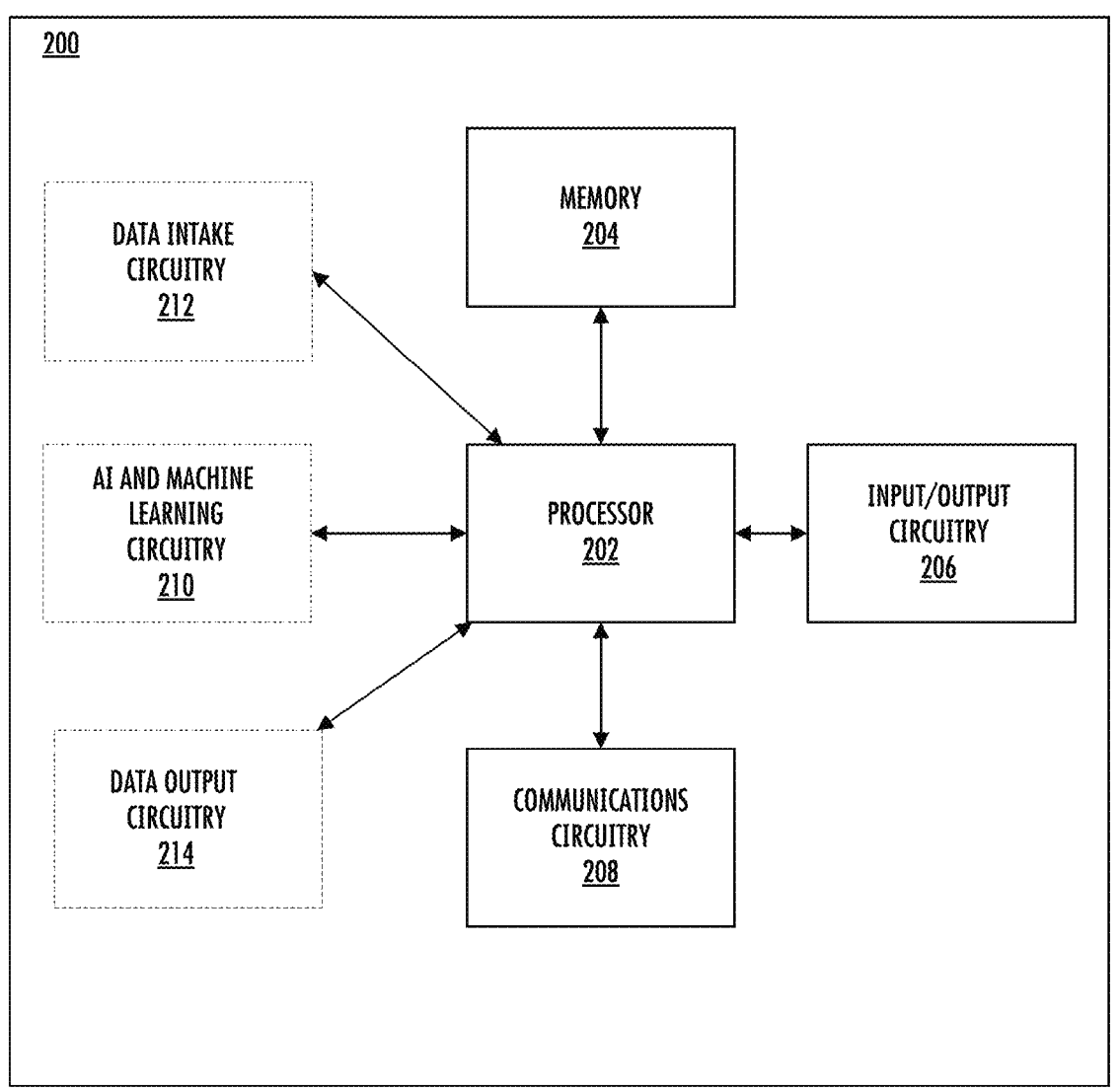
FIG. 2 illustrates an exemplary block diagram of an example apparatus that may be specially configured in accordance with an example embodiment of the present disclosure.
Figure 3:
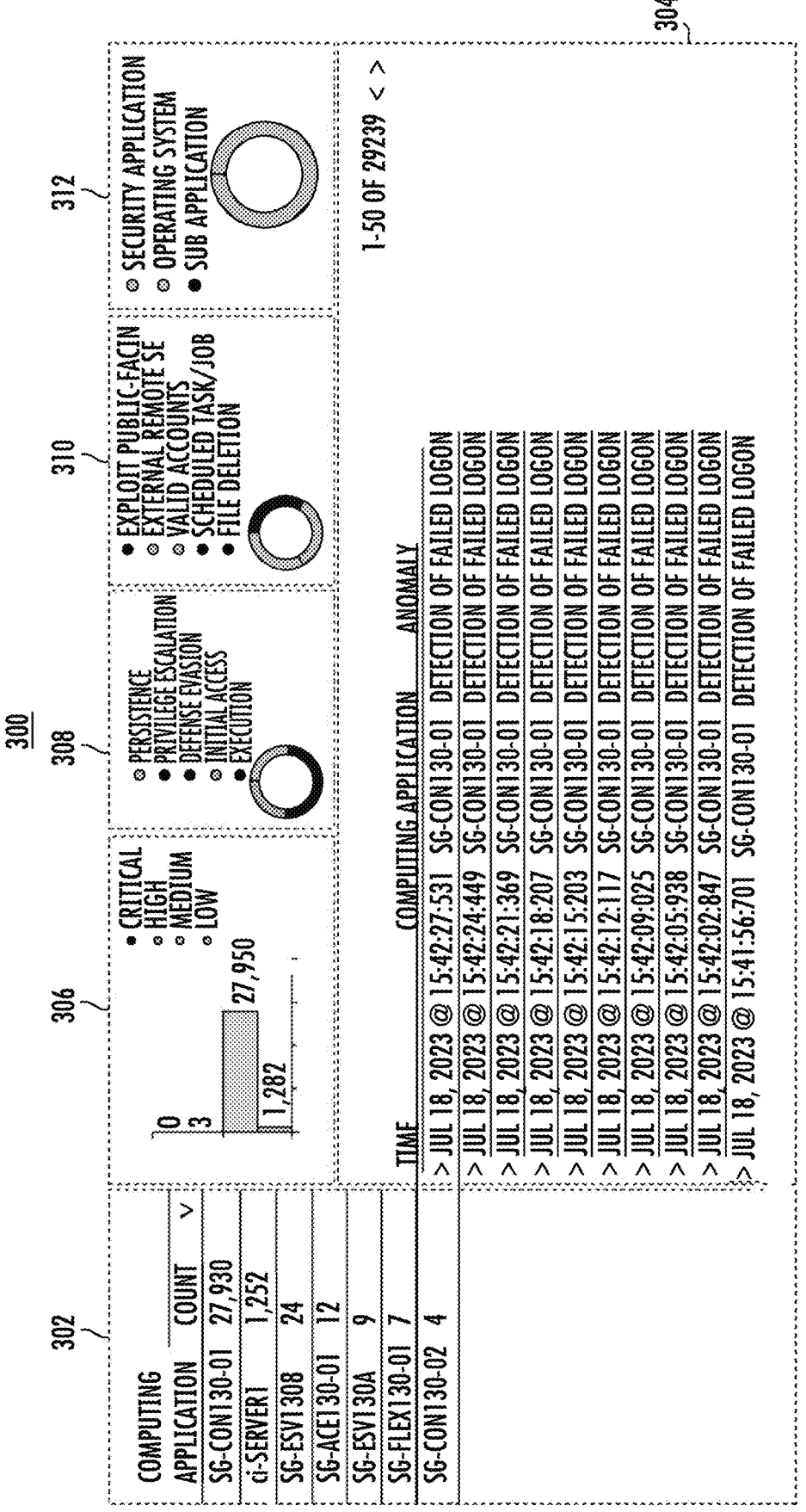
FIG. 3 illustrates an example anomaly characteristics interface in accordance with one or more embodiments of the present disclosure.
Figure 4:
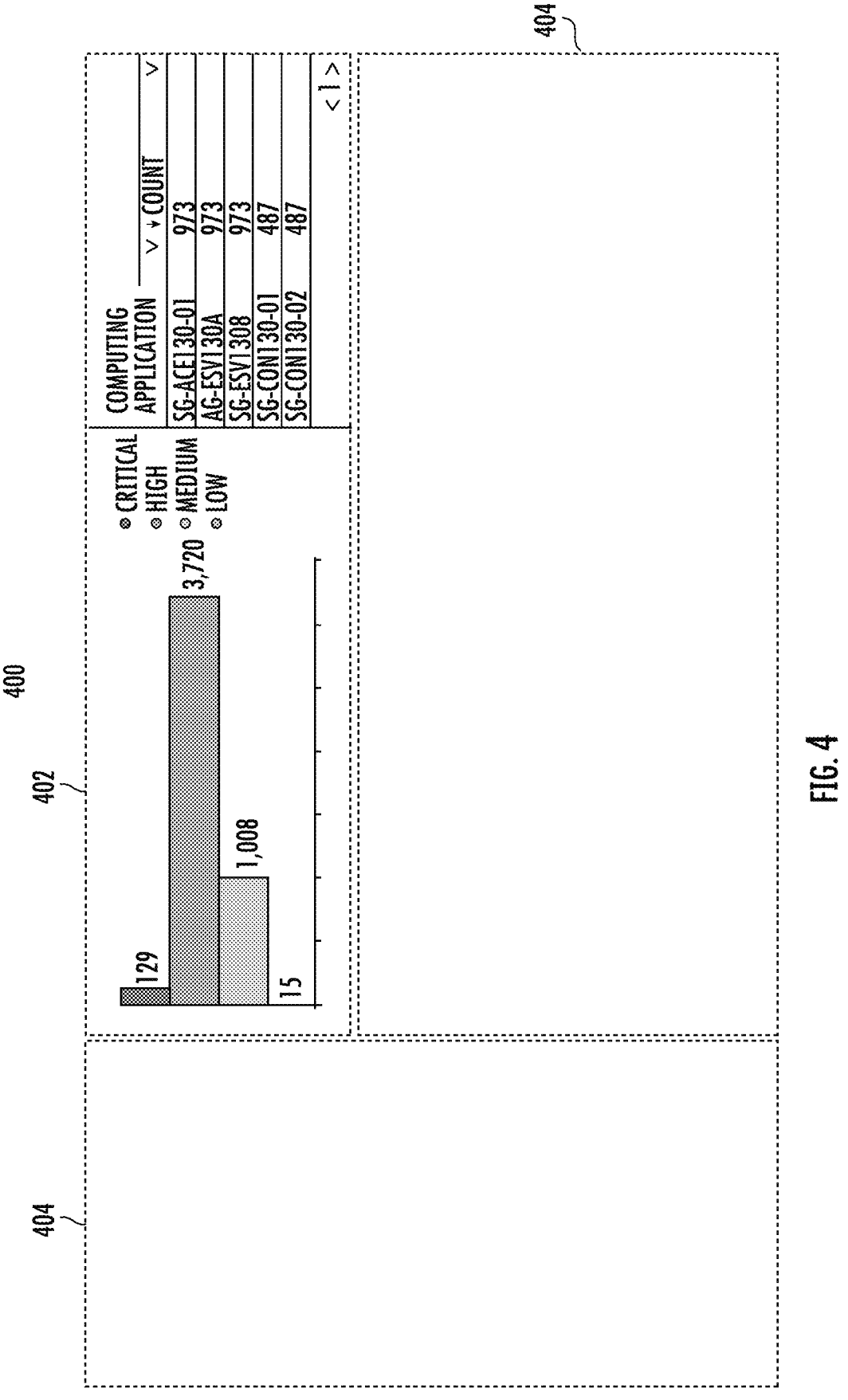
FIG. 4 illustrates an example cybersecurity interface in accordance with one or more embodiments of the present disclosure.
Figure 5:
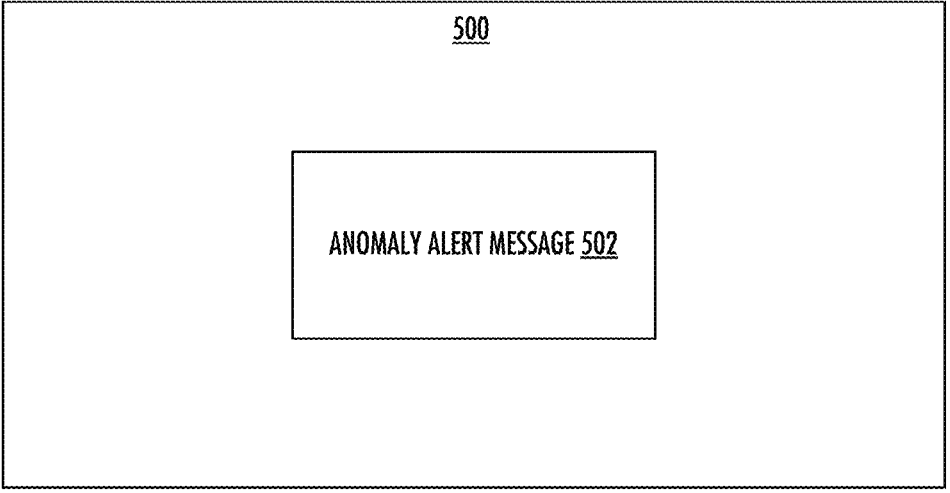
FIG. 5 illustrates an example anomaly alert interface in accordance with one or more embodiments of the present disclosure.

FIG. 2 illustrates an exemplary block diagram of an example apparatus that may be specially configured in accordance with an example embodiment of the present disclosure. Specifically, FIG. 2 depicts an example computing apparatus 200 ("apparatus 200") specially configured in accordance with at least some example embodiments of the present disclosure. For example, the computing apparatus 200 may be embodied as one or more of a specifically configured personal computing apparatus, a specifically configured cloud based computing apparatus, and/or the like. Examples of an apparatus 200 may include, but is not limited to, the anomaly detection system 140, the one or more computing applications 170, the one or more user devices 160, and/or the one or more databases 150. The apparatus 200 includes processor 202, memory 204, input/output circuitry 206, communications circuitry 208, and/or optional artificial intelligence ("AI") and machine learning circuitry 210. In some embodiments, the apparatus 200 is configured to execute and perform the operations described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), memory(ies), circuitry(ies), and/or the like to perform their associated functions such that duplicate hardware is not required for each set of circuitry.

In various embodiments, such as computing apparatus 200 of an anomaly detection system 140, the one or more computing applications 170, and/or the one or more user devices 160 may refer to, for example, one or more computers, computing entities, desktop computers, mobile phones, tablets, phablets, notebooks, laptops, distributed systems, servers, or the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein. In this regard, the apparatus 200 embodies a particular, specially configured computing entity transformed to enable the specific operations described herein and provide the specific advantages associated therewith, as described herein.

Processor 202 or processor circuitry 202 may be embodied in a number of different ways. In various embodiments, the use of the terms "processor" should be understood to include a single core processor, a multi-core processor, multiple processors internal to the apparatus 200, and/or one or more remote or "cloud" processor(s) external to the apparatus 200. In some example embodiments, processor 202 may include one or more processing devices configured to perform independently. Alternatively, or additionally, processor 202 may include one or more processor(s) configured in tandem via a bus to enable independent execution of operations, instructions, pipelining, and/or multithreading.

In an example embodiment, the processor 202 may be configured to execute instructions stored in the memory 204 or otherwise accessible to the processor. Alternatively, or additionally, the processor 202 may be configured to execute hard-coded functionality. As such, whether configured by hardware or software methods, or by a combination thereof, processor 202 may represent an entity (e.g., physically embodied in circuitry) capable of performing operations according to embodiments of the present disclosure while configured accordingly. Alternatively, or additionally, processor 202 may be embodied as an executor of software instructions, and the instructions may specifically configure the processor 202 to perform the various algorithms embodied in one or more operations described herein when such instructions are executed. In some embodiments, the processor 202 includes hardware, software, firmware, and/or a combination thereof that performs one or more operations described herein.

In some embodiments, the processor 202 (and/or coprocessor or any other processing circuitry assisting or otherwise associated with the processor) is/are in communication with the memory 204 via a bus for passing information among components of the apparatus 200.

Memory 204 or memory circuitry 204 may be nontransitory and may include, for example, one or more volatile and/or non-volatile memories. In some embodiments, the memory 204 includes or embodies an electronic storage device (e.g., a computer readable storage medium). In some embodiments, the memory 204 is configured to store information, data, content, applications, instructions, or the like, for enabling an apparatus 200 to carry out various operations and/or functions in accordance with example embodiments of the present disclosure.

Input/output circuitry 206 may be included in the apparatus 200. In some embodiments, input/output circuitry 206 may provide output to the user and/or receive input from a user. The input/output circuitry 206 may be in communication with the processor 202 to provide such functionality. The input/output circuitry 206 may comprise one or more user interface(s). In some embodiments, a user interface may include a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more operations and/or functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a display associated with a user.

Communications circuitry 208 may be included in the apparatus 200. The communications circuitry 208 may include any means such as a device or circuitry embodied in either hardware or a combination of hardware and software that is configured to receive and/or transmit data from/to a network and/or any other device, circuitry, or module in communication with the apparatus 200. In some embodiments the communications circuitry 208 includes, for example, a network interface for enabling communications with a wired or wireless communications network. Additionally or alternatively, the communications circuitry 208 may include one or more network interface card(s), antenna(s), bus(es), switch(es), router(s), modem(s), and supporting hardware, firmware, and/or software, or any other device suitable for enabling communications via one or more communications network(s). In some embodiments, the communications circuitry 208 may include circuitry for interacting with an antenna(s) and/or other hardware or software to cause transmission of signals via the antenna(s) and/or to handle receipt of signals received via the antenna(s). In some embodiments, the communications circuitry 208 enables transmission to and/or receipt of data from a user device and/or other external computing device(s) in communication with the apparatus 200.

Data intake circuitry 212 may be included in the apparatus 200. The data intake circuitry 212 may include hardware, software, firmware, and/or a combination thereof, designed and/or configured to capture, receive, request, and/or otherwise gather data. In some embodiments, the data intake circuitry 212 includes hardware, software, firmware, and/or a combination thereof, that communicates with one or more components of the anomaly detection system 140, the one or more computing applications 170, the one or more user devices 160, and/or the one or more databases 150 to receive particular data. Additionally or alternatively, in some embodiments, the data intake circuitry 212 includes hardware, software, firmware, and/or a combination thereof, that retrieves particular data associated with the anomaly detection system 140, the one or more computing applications 170, the one or more user devices 160, and/or the one or more databases 150 from one or more data repository/repositories accessible to the apparatus 200.

AI and machine learning circuitry 210 may be included in the apparatus 200. The AI and machine learning circuitry 210 may include hardware, software, firmware, and/or a combination thereof designed and/or configured to request, receive, process, generate, and transmit data, datasets, data structures, control signals, and electronic information for training and executing a trained AI and machine learning model configured to facilitating the operations and/or functionalities described herein. For example, in some embodiments the AI and machine learning circuitry 210 includes hardware, software, firmware, and/or a combination thereof, that identifies training data and/or utilizes such training data for training a particular machine learning model, AI, and/or other model to generate particular output data based at least in part on learnings from the training data (e.g., a natural language processing machine learning model). Additionally or alternatively, in some embodiments, the AI and machine learning circuitry 210 includes hardware, software, firmware, and/or a combination thereof, that embodies or retrieves a trained machine learning model, AI and/or other specially configured model utilized to process inputted data. Additionally or alternatively, in some embodiments, the AI and machine learning circuitry 210 includes hardware, software, firmware, and/or a combination thereof that processes received data utilizing one or more algorithm(s), function(s), subroutine(s), and/or the like, in one or more pre-processing and/or subsequent operations that need not utilize a machine learning or AI model.

Data output circuitry 214 may be included in the apparatus 200. The data output circuitry 214 may include hardware, software, firmware, and/or a combination thereof, that configures and/or generates an output based at least in part on data processed by the apparatus 200. In some embodiments, the data output circuitry 214 includes hardware, software, firmware, and/or a combination thereof, that generates a particular report based at least in part on the processed data, for example where the report is generated based at least in part on a particular reporting protocol. Additionally or alternatively, in some embodiments, the data output circuitry 214 includes hardware, software, firmware, and/or a combination thereof, that configures a particular output data object, output data file, and/or user interface for storing, transmitting, and/or displaying. For example, in some embodiments, the data output circuitry 214 generates and/or specially configures a particular data output for transmission to another system sub-system for further processing. Additionally or alternatively, in some embodiments, the data output circuitry 214 includes hardware, software, firmware, and/or a combination thereof, that causes rendering of a specially configured user interface based at least in part on data received by and/or processing by the apparatus 200.

In some embodiments, two or more of the sets of circuitries 202-214 are combinable. Alternatively, or additionally, one or more of the sets of circuitry 202-214 perform some or all of the operations and/or functionality described herein as being associated with another circuitry. In some embodiments, two or more of the sets of circuitry 202-214 are combined into a single module embodied in hardware, software, firmware, and/or a combination thereof. For example, in some embodiments, one or more of the sets of circuitry, for example the AI and machine learning circuitry 210, may be combined with the processor 202, such that the processor 202 performs one or more of the operations described herein with respect the AI and machine learning circuitry 210.

With reference to FIGS. 1-5, in some embodiments, the anomaly detection system 140 may be configured to identify a first plurality of anomaly detection computing programs. In some embodiments, the first plurality of anomaly detection computing programs may be in a first computing program format. For example, the first plurality of anomaly detection computing programs may be in a sigma format (e.g., the first format is a sigma format).

In some embodiments, the anomaly detection system 140 may be configured to transform the first plurality of anomaly detection computing programs into a second plurality of anomaly detection computing programs. For example, the anomaly detection system 140 may be configured to transform the first plurality of anomaly detection computing programs into the second plurality of anomaly detection computing programs by applying the first plurality of anomaly detection computing programs to an anomaly detection computing programs model. In some embodiments, the anomaly detection computing programs model may comprise an algorithmic model and/or a machine learning model (e.g., using AI and machine learning circuitry 210 to perform supervised and/or unsupervised machine learning). In some embodiments, the second plurality of anomaly detection computing programs may be in a second format. For example, the second plurality of anomaly detection computing programs may in a wazuh format (e.g., the second format is a wazuh format). In some embodiments, the first format and/or the second format may be a machine readable format.

In some embodiments, the anomaly detection system 140 may be configured to monitor one or more computing applications 170 using the second plurality of anomaly detection computing programs. In some embodiments, by using the second plurality of anomaly detection computing programs to monitor the one or more computing applications 170, the anomaly detection system 140 may be configured to determine if one or more of the one or more computing applications 170 are affected by an anomaly.

In some embodiments, an anomaly may be any operation, process, and/or the like performed by one or more of the one or more computing applications 170 that differs from standard operations, processes, and/or the like that are performed by one or more of the one or more computing applications 170. For example, an anomaly may include one or more of a suspicious 7zip subprocess, a muted system monitor occurrence, an unusual child processes being performed by an unrelated process, an abuse of telemetry for persistence, a failed login attempt, a login attempt from an unknown internet protocol (IP) address, and/or the like.

In some embodiments, the second plurality of anomaly detection computing programs may include anomaly detection computing programs configured to monitor for specific anomalies. For example, the second plurality of anomaly detection computing programs may include a first anomaly detection computing program configured to monitor for a first anomaly (e.g., a failed login attempt) and a second anomaly detection computing program configured to monitor for a second anomaly (e.g., a login attempt from an unknown IP address).

In some embodiments, the anomaly detection system 140 may be configured to detect that one or more of the one or more computing applications 170 are affected by an anomaly. For example, the anomaly detection system 140 may be configured to detect that a first computing application of the one or more computing applications 170 are affected by an anomaly (e.g., the first computing application is affected by a login attempt from an unknown IP address). In some embodiments, the anomaly detection system 140 may be configured to detect that one or more of the one or more computing applications 170 are affected by an anomaly by monitoring the one or more computing applications 170 using at least the second plurality of anomaly detection computing programs. For example, the anomaly detection system 140 may be configured to detect that the first computing application of the one or more computing applications 170 are affected by an anomaly by monitoring the first computing application using at least the second plurality of anomaly detection computing programs.

In some embodiments, the anomaly detection system 140 may be configured to generate an anomaly characteristics data set based at least in part on the anomaly and/or the second plurality of anomaly detection computing programs. In some embodiments, the anomaly characteristics data set may include data representative of one or more characteristics associated with the anomaly. Said differently, based at least in part on the anomaly and/or using at least the second plurality of anomaly detection computing programs, the anomaly detection system 140 may be configured to generate data representing the characteristics of the detected anomaly.

In some embodiments, the anomaly characteristics data set may include computing application identification data. In this regard, the computing application identification data may indicate the computing application of the one or more computing applications 170 affected by an anomaly. For example, the computing application identification data may indicate that a first computing application (e.g., a computing application identified as SSG-CON130-01) of the one or more computing applications 170 is affected by an anomaly.

In some embodiments, the anomaly characteristics data set may include anomaly identification data. In this regard, the anomaly identification data may indicate the type of anomaly a computing application of the one or more computing applications 170 is affected by. For example, the anomaly identification data may indicate that a first computing application of the one or more computing applications 170 is affected by an anomaly that includes a muted system monitor occurrence.

In some embodiments, the anomaly characteristics data set may include cybersecurity threat level data. In this regard, the cybersecurity threat level data may indicate a cybersecurity threat level associated with an anomaly (e.g., an anomaly detected by the anomaly detection system 140). For example, the cybersecurity threat level data may indicate that a first computing application of the one or more computing applications 170 is affected by an anomaly that is associated with a cybersecurity threat level of low, medium, high, or critical. In this regard, for example, a cybersecurity threat level of low may indicate that an anomaly is associated with a cybersecurity threat level score of between 1 and 3 out of 10, a cybersecurity threat level of medium may indicate that an anomaly is associated with a cybersecurity threat level score of between 4 and 6 out of 10, a cybersecurity threat level of high may indicate that an anomaly is associated with a cybersecurity threat level score of between 7 and 9 out of 10, and a cybersecurity threat level of critical may indicate that an anomaly is associated with a cybersecurity threat level score of 10 out of 10.

In some embodiments, the anomaly characteristics data set may include cybersecurity attack tactic data. In this regard, the cybersecurity attack tactic data may indicate a cybersecurity attack tactic associated with an anomaly. For example, the cybersecurity attack tactic data may indicate that a first computing application of the one or more computing applications 170 is affected by an anomaly that includes a cybersecurity attack on the first computing application that is associated with a particular cybersecurity attack tactic of a plurality cybersecurity attack tactics. In some embodiments, the plurality cybersecurity attack tactics may include one or more of persistence, privilege escalation, defense evasion, initial access, execution, and/or the like.

In some embodiments, the anomaly characteristics data set may include cybersecurity attack technique data. In this regard, the cybersecurity attack technique data may indicate a cybersecurity attack technique associated with an anomaly. For example, the cybersecurity attack technique data may indicate that a first computing application of the one or more computing applications 170 is affected by an anomaly that includes a cybersecurity attack on the first computing application that is associated with a particular cybersecurity attack technique of a plurality cybersecurity attack techniques. In some embodiments, the plurality cybersecurity attack techniques may include one or more of explicit public facing interface, external remote server, valid accounts, scheduled task/job, file deletion, and/or the like.

In some embodiments, the anomaly characteristics data set may include cybersecurity event source data. In this regard, the cybersecurity event source data may indicate a cybersecurity event source associated with an anomaly. For example, the cybersecurity event source data may indicate that a first computing application of the one or more computing applications 170 is affected by an anomaly associated with a particular event source of a plurality of event sources. In some embodiments, the plurality of event sources may include one or more of a security application, an operating system, a sub application, and/or the like.

In some embodiments, the anomaly detection system 140 may be configured to generate an anomaly characteristics interface 300 based at least in part on the anomaly characteristics data set. In this regard, for example, the anomaly characteristics interface 300 may be configured to display at least a portion of the anomaly characteristics data set.

In some embodiments, the anomaly characteristics interface 300 may include a computing application identification component 302. In some embodiments, the computing application identification component 302 may be configured to display the computing application identification data. For example, the computing application identification component 302 may identify the one or more computing applications 170 that the anomaly detection system 140 is monitoring using the second plurality of anomaly detection computing programs (e.g., SG-CON130-01). As another example, the computing application identification component 302 may identify the count of anomalies that the anomaly detection system 140 has detected for each of the one or more computing applications 170 (e.g., the anomaly detection system 140 has detected 27,930 anomalies associated with the computing application SG-CON130-01).

In some embodiments, the anomaly characteristics interface 300 may include an anomaly identification component 304. In some embodiments, the anomaly identification component 304 may be configured to display the anomaly identification data. For example, the anomaly identification component 304 may identify one or more anomalies that the anomaly detection system 140 has detected (e.g., failed login attempt), the computing application that the anomaly is associated with (e.g., SG-CON130-01), the time when the anomaly was detected, and/or the like.

In some embodiments, the anomaly characteristics interface 300 may include a cybersecurity threat level component 306. In some embodiments, the cybersecurity threat level component 306 may be configured to display the cybersecurity threat level data. For example, the cybersecurity threat level component 306 may be configured to display the number of anomalies detected by the anomaly detection system 140 that are associated with a cybersecurity threat level of low, medium, high, and/or critical.

In some embodiments, the anomaly characteristics interface 300 may include a cybersecurity attack tactic component 308. In some embodiments, the cybersecurity attack tactic component 308 may be configured to display the cybersecurity attack tactic data. For example, the cybersecurity attack tactic component 308 may be configured to display the percentage of the anomalies detected by the anomaly detection system 140 that are associated with each of the plurality of cybersecurity attack tactics. Said differently, the cybersecurity attack tactic component 308 may be configured to display the percentage of the anomalies detected by the anomaly detection system 140 that are associated with each of persistence, privilege escalation, defense evasion, initial access, execution, and/or the like.

In some embodiments, the anomaly characteristics interface 300 may include a cybersecurity attack technique component 310. In some embodiments, the cybersecurity attack technique component 310 may be configured to display the cybersecurity attack technique data. For example, the cybersecurity attack technique component 310 may be configured to display the percentage of the anomalies detected by the anomaly detection system 140 that are associated with each of the plurality of cybersecurity attack techniques. Said differently, the cybersecurity attack technique component 310 may be configured to display the percentage of the anomalies detected by the anomaly detection system 140 that are associated with each of explicit public facing interface, external remote server, valid accounts, scheduled task/job, file deletion, and/or the like.

In some embodiments, the anomaly characteristics interface 300 may include a cybersecurity event source component 312. In some embodiments, the cybersecurity event source component 312 may be configured to display the cybersecurity event source data. For example, the cybersecurity event source component 312 may be configured to display the percentage of the anomalies detected by the anomaly detection system 140 that are associated with each of the plurality of cybersecurity event sources. Said differently, the cybersecurity event source component 312 may be configured to display the percentage of the anomalies detected by the anomaly detection system 140 that are associated with each of security application, an operating system, a sub application, and/or the like.

In some embodiments, the anomaly detection system 140 may be configured to generate an anomaly characteristics component 402 based at least in part on the anomaly characteristics interface 300 and/or the anomaly characteristics data set. In this regard, for example, the anomaly characteristics component 402 may be configured to display a portion of the anomaly characteristics data set. Said differently, the anomaly characteristics component 402 may be configured to display a summarized portion of the anomaly characteristics data set (e.g., a summary of the anomaly characteristics interface 300). For example, the anomaly characteristics component 402 may be configured to display a listing of the computing applications in the one or more computing applications 170 and/or the count of the number of anomalies associated with each computing application in the one or more computing applications 170.

In some embodiments, the anomaly detection system 140 may be configured to cause the anomaly characteristics component 402 to be displayed on at least a portion of a cybersecurity interface 400. In some embodiments, the cybersecurity interface 400 may be configured to display the summarized portion of the anomaly characteristics data set and/or other cybersecurity data. For example, the other cybersecurity data may be displayed via a cybersecurity data component 404 on the cybersecurity interface 400.

In some embodiments, the anomaly detection system 140 may be configured to transmit an anomaly alert indication to one or more of the one or more computing applications 170. In some embodiments, the anomaly detection system 140 may be configured to transmit an anomaly alert indication to a computing application for which the anomaly detection system 140 has detected is affected by an anomaly. For example, if the anomaly detection system 140 detects that a first computing application of the one or more computing applications 170 is affected by an anomaly, the anomaly detection system 140 may be configured to transmit an anomaly alert indication to the first computing application.

In some embodiments, the anomaly alert indication may be configured to cause an anomaly alert message 502 to be displayed on an anomaly alert interface 500 associated with the computing application that the anomaly alert indication was transmitted to (e.g., the computing application affected by an anomaly). In some embodiments, the anomaly alert message 502 may be configured to inform a user associated with the computing application that the computing application is affected by an anomaly. For example, the anomaly alert message 502 may be configured to inform a user associated with the computing application that a login attempt from an unknown IP address has been detected.

Example Methods

Figure 6:
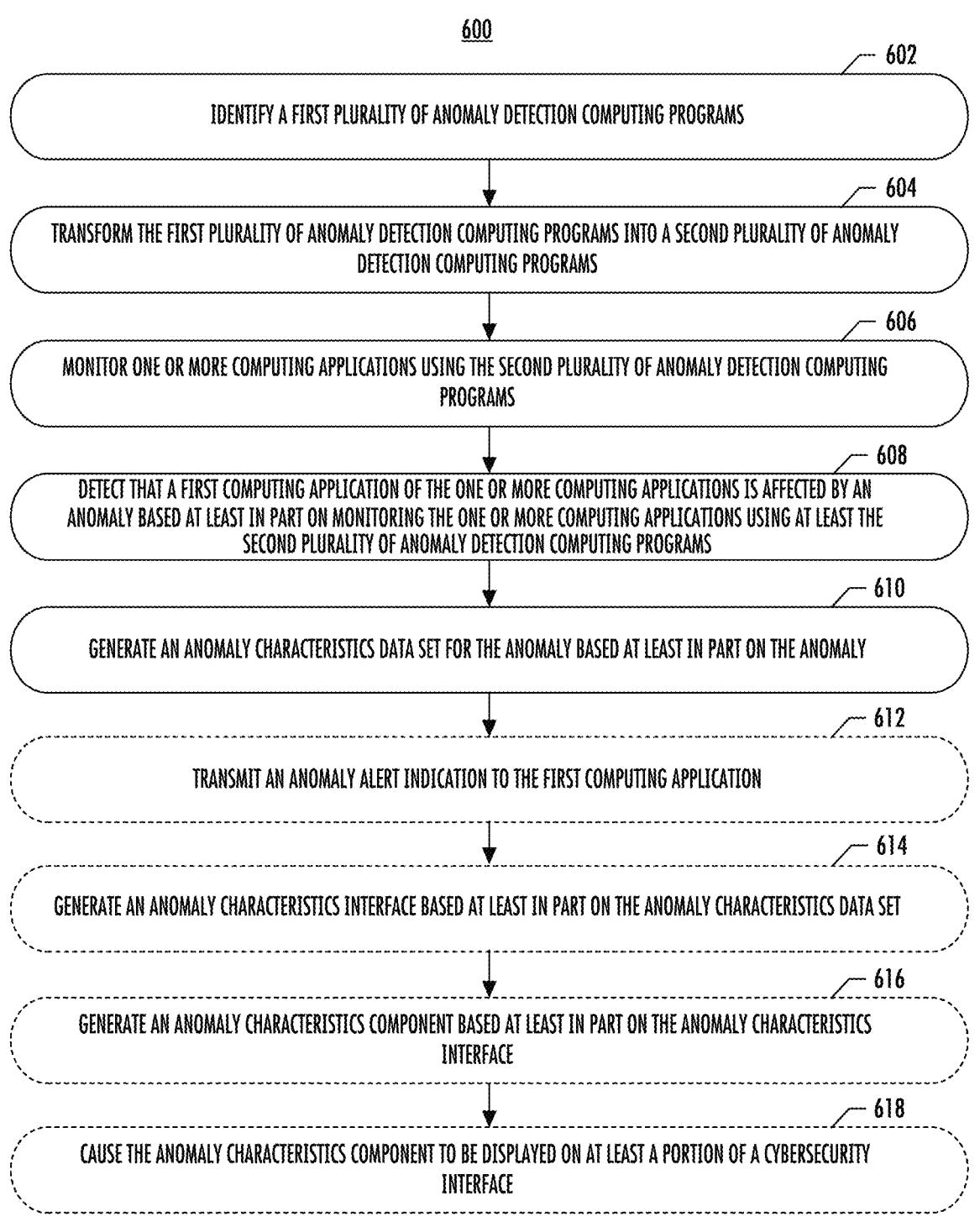
FIG. 6 illustrates a flowchart of an example method in accordance with one or more embodiments of the present disclosure.

Referring now to FIG. 6, a flowchart providing an example method 600 is illustrated. In this regard, FIG. 6 illustrates operations that may be performed by the anomaly detection system 140, the user device 160, the one or more computing applications 170, and/or the like. In some embodiments, the example method 600 defines a computer-implemented process, which may be executable by any of the device(s) and/or system(s) embodied in hardware, software, firmware, and/or a combination thereof, as described herein. In some embodiments, computer program code including one or more computer-coded instructions are stored to at least one non-transitory computer-readable storage medium, such that execution of the computer program code initiates performance of the method 600.

As shown in block 602, the method 600 may include identifying a first plurality of anomaly detection computing programs. As described above, in some embodiments, the first plurality of anomaly detection computing programs may be in a first computing program format. For example, the first plurality of anomaly detection computing programs may be in a sigma format (e.g., the first format is a sigma format).

As shown in block 604, the method 600 may include transforming the first plurality of anomaly detection computing programs into a second plurality of anomaly detection computing programs. As described above, in some embodiments, the anomaly detection system may be configured to transform the first plurality of anomaly detection computing programs into a second plurality of anomaly detection computing programs. For example, the anomaly detection system may be configured to transform the first plurality of anomaly detection computing programs into the second plurality of anomaly detection computing programs by applying the first plurality of anomaly detection computing programs to an anomaly detection computing programs model. In some embodiments, the anomaly detection computing programs model may comprise an algorithmic model and/or a machine learning model (e.g., using AI and machine learning circuitry to perform supervised and/or unsupervised machine learning). In some embodiments, the second plurality of anomaly detection computing programs may be in a second format. For example, the second plurality of anomaly detection computing programs may in a wazuh format (e.g., the second format is a wazuh format). In some embodiments, the first format and/or the second format may be a machine readable format.

As shown in block 606, the method 600 may include monitoring one or more computing applications using the second plurality of anomaly detection computing programs. As described above, in some embodiments, by using the second plurality of anomaly detection computing programs to monitor the one or more computing applications, the anomaly detection system may be configured to determine if one or more of the one or more computing applications are affected by an anomaly.

In some embodiments, an anomaly may be any operation, process, and/or the like performed by one or more of the one or more computing applications that differs from standard operations, processes, and/or the like that are performed by one or more of the one or more computing applications. For example, an anomaly may include one or more of a suspicious 7zip subprocess, a muted system monitor occurrence, an unusual child processes being performed by an unrelated process, an abuse of telemetry for persistence, a failed login attempt, a login attempt from an unknown internet protocol (IP) address, and/or the like.

In some embodiments, the second plurality of anomaly detection computing programs may include anomaly detection computing programs configured to monitor for specific anomalies. For example, the second plurality of anomaly detection computing programs may include a first anomaly detection computing program configured to monitor for a first anomaly (e.g., a failed login attempt) and a second anomaly detection computing program configured to monitor for a second anomaly (e.g., a login attempt from an unknown IP address).

As shown in block 608, the method 600 may include detecting that a first computing application of the one or more computing applications is affected by an anomaly based at least in part on monitoring the one or more computing applications using at least the second plurality of anomaly detection computing programs. As described above, in some embodiments, the anomaly detection system may be configured to detect that one or more of the one or more computing applications are affected by an anomaly. For example, the anomaly detection system may be configured to detect that a first computing application of the one or more computing applications are affected by an anomaly (e.g., the first computing application is affected by a login attempt from an unknown IP address). In some embodiments, the anomaly detection system may be configured to detect that one or more of the one or more computing applications are affected by an anomaly by monitoring the one or more computing applications using at least the second plurality of anomaly detection computing programs. For example, the anomaly detection system may be configured to detect that the first computing application of the one or more computing applications are affected by an anomaly by monitoring the first computing application using at least the second plurality of anomaly detection computing programs.

As shown in block 610, the method 600 may include generating an anomaly characteristics data set for the anomaly based at least in part on the anomaly. As described above, in some embodiments, the anomaly detection system may be configured to generate an anomaly characteristics data set based at least in part on the anomaly and/or the second plurality of anomaly detection computing programs. In some embodiments, the anomaly characteristics data set may include data representative of one or more characteristics associated with the anomaly. Said differently, based at least in part on the anomaly and/or using at least the second plurality of anomaly detection computing programs, the anomaly detection system may be configured to generate data representing the characteristics of the detected anomaly.

In some embodiments, the anomaly characteristics data set may include computing application identification data. In this regard, the computing application identification data may indicate the computing application of the one or more computing applications affected by an anomaly. For example, the computing application identification data may indicate that a first computing application (e.g., a computing application identified as SSG-CON130-01) of the one or more computing applications is affected by an anomaly.

In some embodiments, the anomaly characteristics data set may include anomaly identification data. In this regard, the anomaly identification data may indicate the type of anomaly a computing application of the one or more computing applications is affected by. For example, the anomaly identification data may indicate that a first computing application of the one or more computing applications is affected by an anomaly that includes a muted system monitor occurrence.

In some embodiments, the anomaly characteristics data set may include cybersecurity threat level data. In this regard, the cybersecurity threat level data may indicate a cybersecurity threat level associated with an anomaly (e.g., an anomaly detected by the anomaly detection system). For example, the cybersecurity threat level data may indicate that a first computing application of the one or more computing applications is affected by an anomaly that is associated with a cybersecurity threat level of low, medium, high, or critical. In this regard, for example, a cybersecurity threat level of low may indicate that an anomaly is associated with a cybersecurity threat level score of between 1 and 3 out of 10, a cybersecurity threat level of medium may indicate that an anomaly is associated with a cybersecurity threat level score of between 4 and 6 out of 10, a cybersecurity threat level of high may indicate that an anomaly is associated with a cybersecurity threat level score of between 7 and 9 out of 10, and a cybersecurity threat level of critical may indicate that an anomaly is associated with a cybersecurity threat level score of 10 out of 10.

In some embodiments, the anomaly characteristics data set may include cybersecurity attack tactic data. In this regard, the cybersecurity attack tactic data may indicate a cybersecurity attack tactic associated with an anomaly. For example, the cybersecurity attack tactic data may indicate that a first computing application of the one or more computing applications is affected by an anomaly that includes a cybersecurity attack on the first computing application that is associated with a particular cybersecurity attack tactic of a plurality cybersecurity attack tactics. In some embodiments, the plurality cybersecurity attack tactics may include one or more of persistence, privilege escalation, defense evasion, initial access, execution, and/or the like.

In some embodiments, the anomaly characteristics data set may include cybersecurity attack technique data. In this regard, the cybersecurity attack technique data may indicate a cybersecurity attack technique associated with an anomaly. For example, the cybersecurity attack technique data may indicate that a first computing application of the one or more computing applications is affected by an anomaly that includes a cybersecurity attack on the first computing application that is associated with a particular cybersecurity attack technique of a plurality cybersecurity attack techniques. In some embodiments, the plurality cybersecurity attack techniques may include one or more of explicit public facing interface, external remote server, valid accounts, scheduled task/job, file deletion, and/or the like.

In some embodiments, the anomaly characteristics data set may include cybersecurity event source data. In this regard, the cybersecurity event source data may indicate a cybersecurity event source associated with an anomaly. For example, the cybersecurity event source data may indicate that a first computing application of the one or more computing applications is affected by an anomaly associated with a particular event source of a plurality of event sources. In some embodiments, the plurality of event sources may include one or more of a security application, an operating system, a sub application, and/or the like.

As shown in block 612, the method 600 may optionally include transmitting an anomaly alert indication to the first computing application. As described above, in some embodiments, the anomaly detection system may be configured to transmit an anomaly alert indication to one or more of the one or more computing applications. In some embodiments, the anomaly detection system may be configured to transmit an anomaly alert indication to a computing application for which the anomaly detection system has detected is affected by an anomaly. For example, if the anomaly detection system detects that a first computing application of the one or more computing applications is affected by an anomaly, the anomaly detection system may be configured to transmit an anomaly alert indication to the first computing application.

In some embodiments, the anomaly alert indication may be configured to cause an anomaly alert message to be displayed on an anomaly alert interface associated with the computing application that the anomaly alert indication was transmitted to (e.g., the computing application affected by an anomaly). In some embodiments, the anomaly alert message may be configured to inform a user associated with the computing application that the computing application is affected by an anomaly. For example, the anomaly alert message may be configured to inform a user associated with the computing application that a login attempt from an unknown IP address has been detected.

As shown in block 614, the method 600 may optionally include generating an anomaly characteristics interface based at least in part on the anomaly characteristics data set. As described above, in some embodiments, the anomaly characteristics interface may be configured to display at least a portion of the anomaly characteristics data set.

In some embodiments, the anomaly characteristics interface may include a computing application identification component. In some embodiments, the computing application identification component may be configured to display the computing application identification data. For example, the computing application identification component may identify the one or more computing applications that the anomaly detection system is monitoring using the second plurality of anomaly detection computing programs (e.g., SG-CON130-01). As another example, the computing application identification component may identify the count of anomalies that the anomaly detection system has detected for each of the one or more computing applications (e.g., the anomaly detection system has detected 27,930 anomalies associated with the computing application SG-CON130-01).

In some embodiments, the anomaly characteristics interface may include an anomaly identification component. In some embodiments, the anomaly identification component may be configured to display the anomaly identification data. For example, the anomaly identification component may identify one or more anomalies that the anomaly detection system has detected (e.g., failed login attempt), the computing application that the anomaly is associated with (e.g., SG-CON130-01), the time when the anomaly was detected, and/or the like.

In some embodiments, the anomaly characteristics interface may include a cybersecurity threat level component. In some embodiments, the cybersecurity threat level component may be configured to display the cybersecurity threat level data. For example, the cybersecurity threat level component may be configured to display the number of anomalies detected by the anomaly detection system that are associated with a cybersecurity threat level of low, medium, high, and/or critical.

In some embodiments, the anomaly characteristics interface may include a cybersecurity attack tactic component. In some embodiments, the cybersecurity attack tactic component may be configured to display the cybersecurity attack tactic data. For example, the cybersecurity attack tactic component may be configured to display the percentage of the anomalies detected by the anomaly detection system that are associated with each of the plurality of cybersecurity attack tactics. Said differently, the cybersecurity attack tactic component may be configured to display the percentage of the anomalies detected by the anomaly detection system that are associated with each of persistence, privilege escalation, defense evasion, initial access, execution, and/or the like.

In some embodiments, the anomaly characteristics interface may include a cybersecurity attack technique component. In some embodiments, the cybersecurity attack technique component may be configured to display the cybersecurity attack technique data. For example, the cybersecurity attack technique component may be configured to display the percentage of the anomalies detected by the anomaly detection system that are associated with each of the plurality of cybersecurity attack techniques. Said differently, the cybersecurity attack technique component may be configured to display the percentage of the anomalies detected by the anomaly detection system that are associated with each of explicit public facing interface, external remote server, valid accounts, scheduled task/job, file deletion, and/or the like.

In some embodiments, the anomaly characteristics interface may include a cybersecurity event source component. In some embodiments, the cybersecurity event source component may be configured to display the cybersecurity event source data. For example, the cybersecurity event source component may be configured to display the percentage of the anomalies detected by the anomaly detection system that are associated with each of the plurality of cybersecurity event sources. Said differently, the cybersecurity event source component may be configured to display the percentage of the anomalies detected by the anomaly detection system that are associated with each of security application, an operating system, a sub application, and/or the like.

As shown in block 616, the method 600 may optionally include generating an anomaly characteristics component based at least in part on the anomaly characteristics interface. As described above, in some embodiments, the anomaly detection system may be configured to generate an anomaly characteristics component based at least in part on the anomaly characteristics interface and/or the anomaly characteristics data set. In this regard, for example, the anomaly characteristics component may be configured to display a portion of the anomaly characteristics data set. Said differently, the anomaly characteristics component may be configured to display a summarized portion of the anomaly characteristics data set (e.g., a summary of the anomaly characteristics interface). For example, the anomaly characteristics component may be configured to display a listing of the computing applications in the one or more computing applications and/or the count of the number of anomalies associated with each computing application in the one or more computing applications.

As shown in block 618, the method 600 may optionally include causing the anomaly characteristics component to be displayed on at least a portion of a cybersecurity interface. As described above, in some embodiments, the anomaly detection system may be configured to cause the anomaly characteristics component to be displayed on at least a portion of a cybersecurity interface. In some embodiments, the cybersecurity interface may be configured to display the summarized portion of the anomaly characteristics data set and/or other cybersecurity data. For example, the other cybersecurity data may be displayed via a cybersecurity data component on the cybersecurity interface.

Operations and/or functions of the present disclosure have been described herein, such as in flowcharts. As will be appreciated, computer program instructions may be loaded onto a computer or other programmable apparatus (e.g., hardware) to produce a machine, such that the resulting computer or other programmable apparatus implements the operations and/or functions described in the flowchart blocks herein. These computer program instructions may also be stored in a computer-readable memory that may direct a computer, processor, or other programmable apparatus to operate and/or function in a particular manner, such that the instructions stored in the computer-readable memory produce an article of manufacture, the execution of which implements the operations and/or functions described in the flowchart blocks. The computer program instructions may also be loaded onto a computer, processor, or other programmable apparatus to cause a series of operations to be performed on the computer, processor, or other programmable apparatus to produce a computer-implemented process such that the instructions executed on the computer, processor, or other programmable apparatus provide operations for implementing the functions and/or operations specified in the flowchart blocks. The flowchart blocks support combinations of means for performing the specified operations and/or functions and combinations of operations and/or functions for performing the specified operations and/or functions. It will be understood that one or more blocks of the flowcharts, and combinations of blocks in the flowcharts, can be implemented by special purpose hardware-based computer systems which perform the specified operations and/or functions, or combinations of special purpose hardware with computer instructions.

While this specification contains many specific embodiments and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations and/or functions are illustrated in the drawings in a particular order, this should not be understood as requiring that such operations and/or functions be performed in the particular order shown or in sequential order, or that all illustrated operations be performed, to achieve desirable results. In certain circumstances, operations and/or functions in alternative ordering may be advantageous. In some cases, the actions recited in the claims may be performed in a different order and still achieve desirable results. Thus, while particular embodiments of the subject matter have been described, other embodiments are within the scope of the following claims.

While this specification contains many specific embodiment and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are illustrated in the drawings in a particular order, this should not be understood as requiring that such operations be performed in the particular order shown or in sequential order, or that all illustrated operations be performed, to achieve desirable results. In certain circumstances, operations in alternative ordering may be advantageous. In some cases, the actions recited in the claims may be performed in a different order and still achieve desirable results.

That which is claimed:

1. A computer-implemented method comprising:

identifying, using anomaly detection system, a first plurality of anomaly detection computing programs, wherein the first plurality of anomaly detection computing programs is in a first computing program format;

transforming, using an anomaly detection computing programs model of the anomaly detection system, the first plurality of anomaly detection computing programs into a second plurality of anomaly detection computing programs, wherein the second plurality of anomaly detection computing programs is in a second computing program format;

monitoring, using the anomaly detection system and via a network, one or more computing applications using the second plurality of anomaly detection computing programs;

detecting, using the anomaly detection system, that a first computing application of the one or more computing applications is affected by an anomaly based at least in part on monitoring the one or more computing applications using at least the second plurality of anomaly detection computing programs;

generating, using the anomaly detection system, an anomaly characteristics data set for the anomaly, wherein the anomaly characteristics data set comprises a computing application identification characteristic and a cybersecurity attack tactic characteristic;

generating, using the anomaly detection system and the computing application identification characteristic, a computing application identification interface component;

generating, using the anomaly detection system and the cybersecurity attack tactic characteristic, a cybersecurity attack tactic interface component; and in response to generating the computing application identification interface component and the cybersecurity attack tactic interface component, applying the computing application identification interface component and the cybersecurity attack tactic interface component to an anomaly characteristics interface associated with the anomaly detection system.

2. The computer-implemented method of claim 1, further comprising:

transmitting an anomaly alert indication to the first computing application.

3. The computer-implemented method of claim 1, wherein the first computing program format is a sigma format.

4. The computer-implemented method of claim 1, wherein the second computing program format is a wazuh format.

5. The computer-implemented method of claim 1, wherein the first computing program format and the second computing program format are in a machine readable format.

6. The computer-implemented method of claim 1, wherein the anomaly characteristics data set comprises one or more of anomaly identification data, cybersecurity threat level data, cybersecurity attack technique data, or cybersecurity event source data.

7. The computer-implemented method of claim 6, further comprising:

generating an anomaly characteristics interface based at least in part on the anomaly characteristics data set.

8. The computer-implemented method of claim 7, wherein the anomaly characteristics interface comprises one or more of a anomaly identification component, cybersecurity level component, cybersecurity attack technique component, or cybersecurity event source component.

9. The computer-implemented method of claim 7, further comprising:

generating an anomaly characteristics component based at least in part on the anomaly characteristics interface.

10. The computer-implemented method of claim 9, further comprising:

causing the anomaly characteristics component to be displayed on at least a portion of a cybersecurity interface.

11. The computer-implemented method of claim 1, further comprising:

generating, using the anomaly detection system and the anomaly characteristics data set, an anomaly characteristics interface component, wherein the anomaly characteristics interface component comprises a condensed portion of at least one of the computing application identification interface component or the cybersecurity attack tactic interface component; and causing, using the anomaly detection system, the anomaly characteristics interface component to be rendered on a cybersecurity interface associated with the anomaly detection system, wherein causing anomaly characteristics interface component to be rendered on the cybersecurity interface comprises replacing the anomaly characteristics interface with the cybersecurity interface on a display associated with the anomaly detection system.

12. The computer-implemented method of claim 1, further comprising:

transmitting, using the anomaly detection system and via the network, an anomaly alert indication to the first computing application, wherein the anomaly alert indication is configured to cause an anomaly alert message to be displayed on an anomaly alert interface of a display associated with the first computing application.

13. The computer-implemented method of claim 1, wherein the anomaly detection computing programs model comprises a machine learning model configured to transform the first plurality of anomaly detection computing programs into the second plurality of anomaly detection computing programs using unsupervised machine learning.

14. An apparatus comprising at least one processor and at least one non-transitory memory including computer-coded instructions thereon, the computer coded instructions, with the at least one processor, cause the apparatus to:

identify, using anomaly detection system, a first plurality of anomaly detection computing programs, wherein the first plurality of anomaly detection computing programs is in a first computing program format;

transform, using an anomaly detection computing programs model of the anomaly detection system, the first plurality of anomaly detection computing programs into a second plurality of anomaly detection computing programs, wherein the second plurality of anomaly detection computing programs is in a second computing program format;

monitor, using the anomaly detection system and via a network, one or more computing applications using the second plurality of anomaly detection computing programs;

detect, using the anomaly detection system, that a first computing application of the one or more computing applications is affected by an anomaly based at least in part on monitoring the one or more computing applications using at least the second plurality of anomaly detection computing programs;

generate, using the anomaly detection system, an anomaly characteristics data set for the anomaly, wherein the anomaly characteristics data set comprises a computing application identification characteristic and a cybersecurity attack tactic characteristic;

generating, using the anomaly detection system and the computing application identification characteristic, a computing application identification interface component;

generating, using the anomaly detection system and the cybersecurity attack tactic characteristic, a cybersecurity attack tactic interface component; and in response to generating the computing application identification interface component and the cybersecurity attack tactic interface component, applying the computing application identification interface component and the cybersecurity attack tactic interface component to an anomaly characteristics interface associated with the anomaly detection system.

15. The apparatus of claim 14, wherein the anomaly characteristics data set comprises one or more of anomaly identification data, cybersecurity threat level data, cybersecurity attack technique data, or cybersecurity event source data.

16. The apparatus of claim 15, wherein the computer coded instructions, further with the at least one processor, cause the apparatus to:

generate an anomaly characteristics interface based at least in part on the anomaly characteristics data set.

17. The apparatus of claim 16, wherein the anomaly characteristics interface comprises one or more of cybersecurity level component, cybersecurity attack technique component, or cybersecurity event source component.

18. The apparatus of claim 16, wherein the computer coded instructions, further with the at least one processor, cause the apparatus to:

generate an anomaly characteristics component based at least in part on the anomaly characteristics interface.

19. The apparatus of claim 18, wherein the computer coded instructions, further with the at least one processor, cause the apparatus to:

cause the anomaly characteristics component to be displayed on at least a portion of a cybersecurity interface.

20. A computer program product comprising at least one non-transitory computer-readable storage medium having computer program code stored thereon that, in execution with at least one processor, configures the computer program product for:

identifying, using anomaly detection system, a first plurality of anomaly detection computing programs, wherein the first plurality of anomaly detection computing programs is in a first computing program format;

transforming, using an anomaly detection computing programs model of the anomaly detection system, the first plurality of anomaly detection computing programs into a second plurality of anomaly detection computing programs, wherein the second plurality of anomaly detection computing programs is in a second computing program format;

monitoring, using the anomaly detection system and via a network, one or more computing applications using the second plurality of anomaly detection computing programs;

detecting, using the anomaly detection system, that a first computing application of the one or more computing applications is affected by an anomaly based at least in part on monitoring the one or more computing applications using at least the second plurality of anomaly detection computing programs;

generating, using the anomaly detection system, an anomaly characteristics data set for the anomaly, wherein the anomaly characteristics data set comprises a computing application identification characteristic and a cybersecurity attack tactic characteristic;

generating, using the anomaly detection system and the computing application identification characteristic, a computing application identification interface component;

generating, using the anomaly detection system and the cybersecurity attack tactic characteristic, a cybersecurity attack tactic interface component; and in response to generating the computing application identification interface component and the cybersecurity attack tactic interface component, applying the computing application identification interface component and the cybersecurity attack tactic interface component to an anomaly characteristics interface associated with the anomaly detection system.

* * * * *